(12) United States Patent
Liao

(10) Patent No.: US 7,433,003 B2
(45) Date of Patent: Oct. 7, 2008

(54) LIQUID CRYSTAL ON SILICON PANEL AND METHOD OF MANUFACTURING THE SAME

(75) Inventor: Bing-Jei Liao, Tainan County (TW)

(73) Assignee: Himax Technologies, Inc., Tainan County (TW)

( * ) Notice: Subject to any disclaimer, the term of this patent is extended or adjusted under 35 U.S.C. 154(b) by 0 days.

(21) Appl. No.: 10/295,375

(22) Filed: Nov. 15, 2002

(65) Prior Publication Data

US 2004/0095527 A1    May 20, 2004

(51) Int. Cl.
*G02F 1/1335* (2006.01)
*G02F 1/1333* (2006.01)
*G02F 1/1343* (2006.01)

(52) U.S. Cl. .................. 349/106; 349/110; 349/139

(58) Field of Classification Search .............. 349/110, 349/106–109, 139, 143
See application file for complete search history.

(56) References Cited

U.S. PATENT DOCUMENTS 5,681,675 A * 10/1997 Kurauchi et al. ............. 430/20
5,916,714 A * 6/1999 Sato et al. ...................... 430/7
6,104,459 A * 8/2000 Oike et al. .................. 349/105
6,281,960 B1 * 8/2001 Kishimoto et al. .......... 349/156
6,476,888 B2 * 11/2002 Yamanashi ................. 349/106
6,657,687 B2 * 12/2003 Takizawa .................... 349/106
6,678,025 B2 * 1/2004 Iida et al. .................... 349/111
6,704,075 B2 * 3/2004 Takizawa et al. ........... 349/106
6,727,967 B2 * 4/2004 Nakamura et al. .......... 349/114
6,768,530 B2 * 7/2004 Matsuyama et al. ........ 349/123

FOREIGN PATENT DOCUMENTS

JP           11337717       * 12/1999

\* cited by examiner

*Primary Examiner*—Dung T. Nguyen
(74) *Attorney, Agent, or Firm*—Ladas & Parry, LLP

(57) ABSTRACT

A liquid crystal on silicon panel. The liquid crystal on silicon panel includes a lower and upper substrate, a liquid crystal sealed between the lower and the upper substrate, a plurality of color pixels disposed on the lower substrate and separated from each other by gaps, each color pixel comprising a pixel electrode on the lower substrate and a color filter on the pixel electrode, and a photo-resist material.

7 Claims, 6 Drawing Sheets

LIQUID CRYSTAL ON SILICON PANEL AND METHOD OF MANUFACTURING THE SAME

BACKGROUND OF THE INVENTION

1. Field of the Invention

The present invention relates to a liquid crystal on silicon panel and particularly to a liquid crystal on silicon panel which yields high image quality.

2. Description of the Prior Art

As an alternative to a conventional projector in which an image on a slide is projected onto a screen, a new-generation projector using a liquid crystal display element has been developed and is commercially available, referred to as an LCD projector. Generally speaking, there are three known projection type color image display methods for the liquid crystal display element. They are subtractive, temporal multiplexing, and spatial multiplexing display methods.

In the subtractive display method, three liquid crystal display elements corresponding to three primary colors are used. Optical systems for transmitting respective color lights of three primary colors and display elements for forming an image by controlling respective color lights are provided in pairs, independent of one another. Images of respective colors are optically superimposed on one another to display a full color image. Such a display device may have three individual light sources and color filters serving as source emitting the respective color beams of red, green and blue. Alternatively, the light emitted from the single white light source may be separated into color beams of three primary colors, i.e., red, green and blue, by dichroic mirrors.

In the temporal multiplexing display method, only one liquid crystal display element is used and color beams of three primary colors, i.e. red, green and blue are sequentially projected onto the liquid crystal display element. The liquid crystal display element forms images for the three primary colors sequentially and synchronously with the switching of the color beams. With a relatively high switching rate, the images of respective colors are visually superimposed on one another to display a full color image.

In the spatial multiplexing display method, the light is projected onto a liquid crystal display element having a color filter pattern of three primary colors in the form of a mosaic, by way of an optical system similar to a slide projector. The optical system can be simple in its construction and only one liquid crystal display element is used. Accordingly, the spatial multiplexing display method is suitable for a small projection type system.

FIG. 1 is a diagram showing a partial cross section of a conventional liquid crystal on silicon (LCoS) panel used in a spatial multiplexing display. It includes a silicon substrate 11, an Indium Tin Oxide (ITO) glass 12 used as a common electrode, a liquid crystal 15 sealed between the substrate 11 and the ITO glass 12, and color pixels composed of aluminum layers 131~133 used as reflective pixel electrodes and color filters 141~143 respectively of red, green and blue. An integrated driving circuit (not shown) disposed within the silicon substrate 11 generates voltage differences between the pixel electrodes 131~133 and the common electrode 12. Each of the electric fields induced by the voltage differences twists the liquid crystal 15 within each color pixel region toward a desired direction, which forms a dark or bright or gray color pixel. The reflective pixel electrodes 131~133 act as mirrors. When the light is projected onto the color pixels, it is colored and reflected onto a screen by the bright color pixels. Thus, using a liquid crystal display element having a matrix of rows and columns of these color pixels, an LCD projector generates a full color image on the screen.

In FIG. 1, it is noted that gaps 16 are located between the color pixels. The gaps 16 prevent the color filters 141~143 from forming horn-shape portions. If the color filters 141~143 are adjacent to one another without the gaps 16, the horn-shape portions easily form on the borders between the color filters 141~143 due to misalignment in the manufacturing process.

However, the voltage differences between the common and pixel electrodes induce stray electric fields in the gaps 16 and the pixel edge areas M. The liquid crystal 15 located in the gaps 16 and the areas M is thereby twisted in unwanted directions. Such fringe effect degrades images in the pixel edge area, deteriorating image quality.

SUMMARY OF THE INVENTION

The object of the present invention is to provide a new liquid crystal on silicon panel and a manufacturing method thereof to eliminate disadvantageous fringe effect. A projector using the inventive liquid crystal on silicon panel can yield better quality image than one using the conventional liquid crystal on silicon panel.

The present invention provides a liquid crystal on silicon panel. The liquid crystal on silicon panel comprises a lower and upper substrate, a liquid crystal sealed between the lower and the upper substrate, a plurality of color pixels disposed on the lower substrate and separated from each other by gaps, each color pixel comprises a pixel electrode on the lower substrate and a color filter on the pixel electrode, and a photo-resist material.

The present invention provides another liquid crystal on silicon panel. The liquid crystal on silicon panel comprises a lower and upper substrate, a liquid crystal sealed between the lower and the upper substrate, and a plurality of color pixels disposed on the lower substrate and separated from each other by gaps, each color pixel comprises a pixel electrode on the lower substrate and a color filter on the pixel electrode, wherein, in each color pixel, the pixel electrode has edges surrounded by edges of the color filter.

The present invention further provides a method for manufacturing a liquid crystal on silicon panel. The method comprises the steps of providing a lower and upper substrate, forming a plurality of color pixels on the lower substrate and gaps among the color pixels, each color pixel comprising a pixel electrode on the lower substrate and a color filter on the pixel electrode, filling the gaps with a photo-resist material, and sealing a liquid crystal between the lower and upper substrate.

The present invention provides another method for manufacturing a liquid crystal on silicon panel. The method comprises the steps of providing a lower and upper substrate, forming a plurality of color pixels on the lower substrate and gaps among the color pixels, each color pixel comprising a pixel electrode on the lower substrate and a color filter on the pixel electrode, and sealing a liquid crystal between the lower and upper substrate, wherein, in each color pixel, the pixel electrode has edges surrounded by edges of the color filter.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
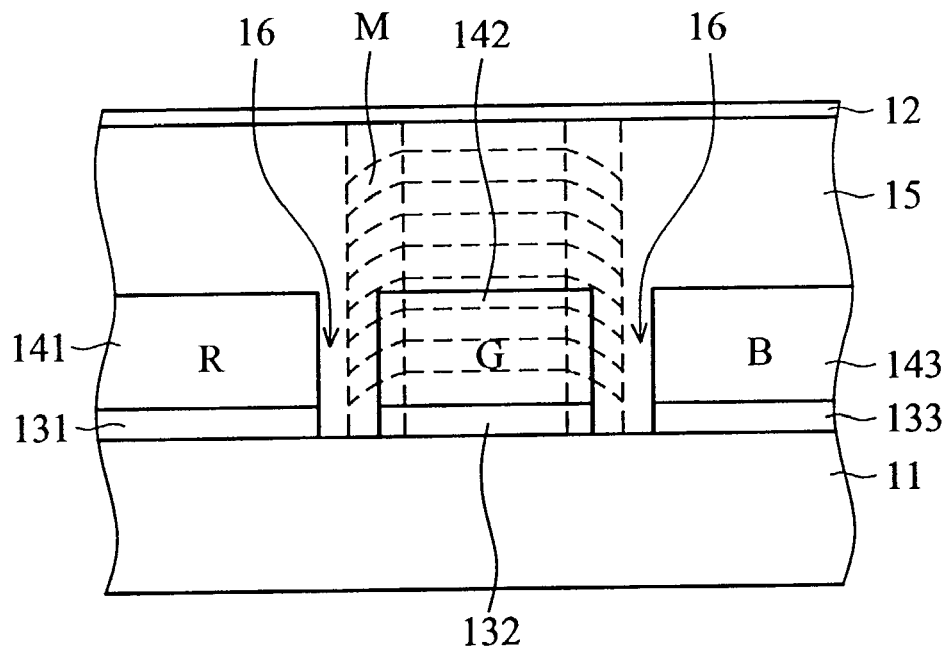
FIG. 1 is a diagram showing a partial cross section of a conventional liquid crystal on silicon (LCoS) panel used in a spatial multiplexing display.
Figure 2:
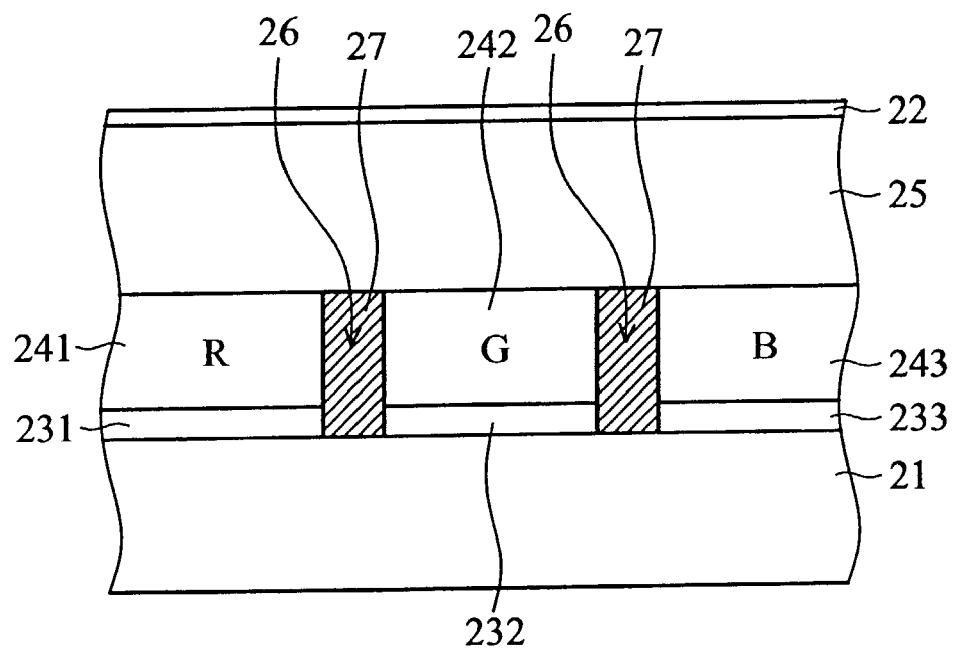
FIG. 2 is a diagram showing a partial cross section of a LCoS panel according to a first embodiment of the invention.

FIG. 2 is a diagram showing a partial cross section of a LCoS panel according to a first embodiment of the invention. It includes a lower silicon substrate 21, an upper ITO glass substrate 22, reflective pixel electrodes 231~233, microcolor filters 241~243 respectively of red, green and blue, a liquid crystal 25, and photo-resist material 27. The liquid crystal 25 is sealed between the lower and the upper substrate 21 and 22. Color pixels comprise pixel electrodes 231~233 formed on the lower substrate 21 and the color filters 241~243 formed on the pixel electrodes 231~233. The color pixels on the lower substrate 21 are separated from each other by gaps 26 filled with the photo-resist material 27 or the like. The photo resist material 27 can be substituted for by a non-reflective material or a light-absorber. The lower substrate 21 comprises an integrated driving circuit (not shown) for providing voltage differences between the upper substrate 22 (common electrode) and the pixel electrodes 231~233. The photo-resist material 27 preferably contains a black pigment to block the light reflected from the mirrors 231~233. A planar surface composed of the photo-resist material 27 filling the gaps 26 and the microcolor filters 241~243 is formed by planarization such as CMP. In each color pixel, the color filter and the pixel electrode have edges aligned with each other.

In the previously described embodiment, the stray electric fields induced in the gaps 26 by the voltage differences between the common and pixel electrodes have no impact on the image quality since there is no liquid crystal in the gaps 26. Thus, fringe effect caused by improperly twisted liquid crystal filling the gaps in the prior art is eliminated.

Figure 3A:
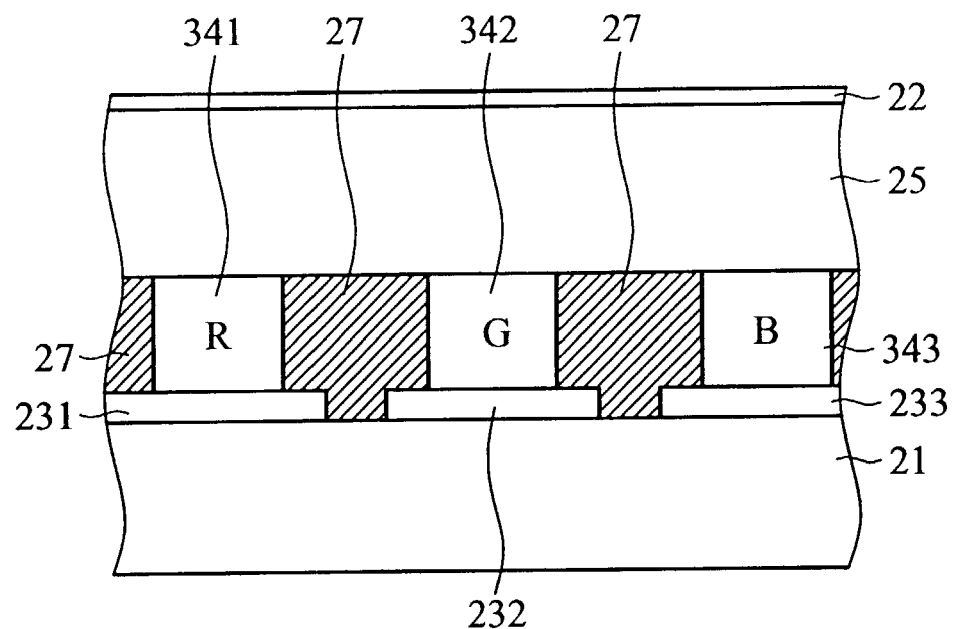
FIG. 3A is a diagram showing a partial cross section of a LCoS panel according to a second embodiment of the invention.
Figure 3B:
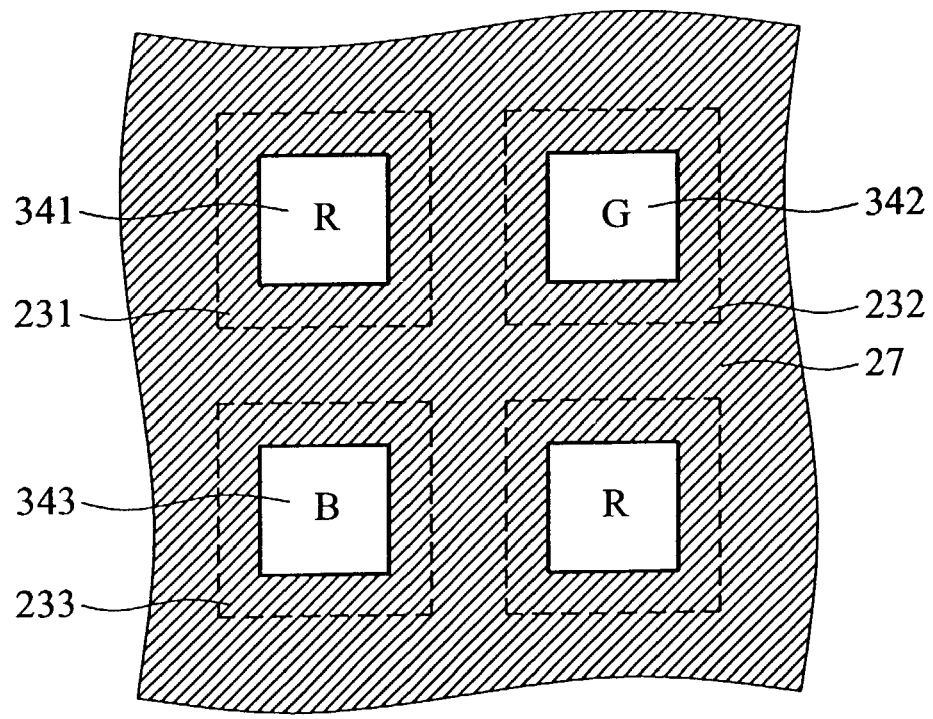
FIG. 3B is a diagram showing a top view of the second embodiment.

FIG. 3A is a diagram showing a partial cross section of a LCoS panel according to a second embodiment of the invention. The same elements in FIG. 2 and FIG. 3A refer to the same symbols for clarity. By comparing FIG. 2 and FIG. 3A, it is noted that the color filters 341~343 shown in FIG. 3A have edges not aligned with the edges of the pixel electrodes 231~233. Further, by referring to the top view shown in FIG. 3B, it is also noted that the edges of the color filters 341~343 are surrounded by those of the pixel electrodes 231~233. This in advance eliminates fringe effect caused by improperly twisted liquid crystal located in the pixel edge areas M in the prior art since the light is blocked by the photo-resist material 27 from transmitting through the pixel edge areas. However, this also reduces the aperture ratio.

Figure 4:
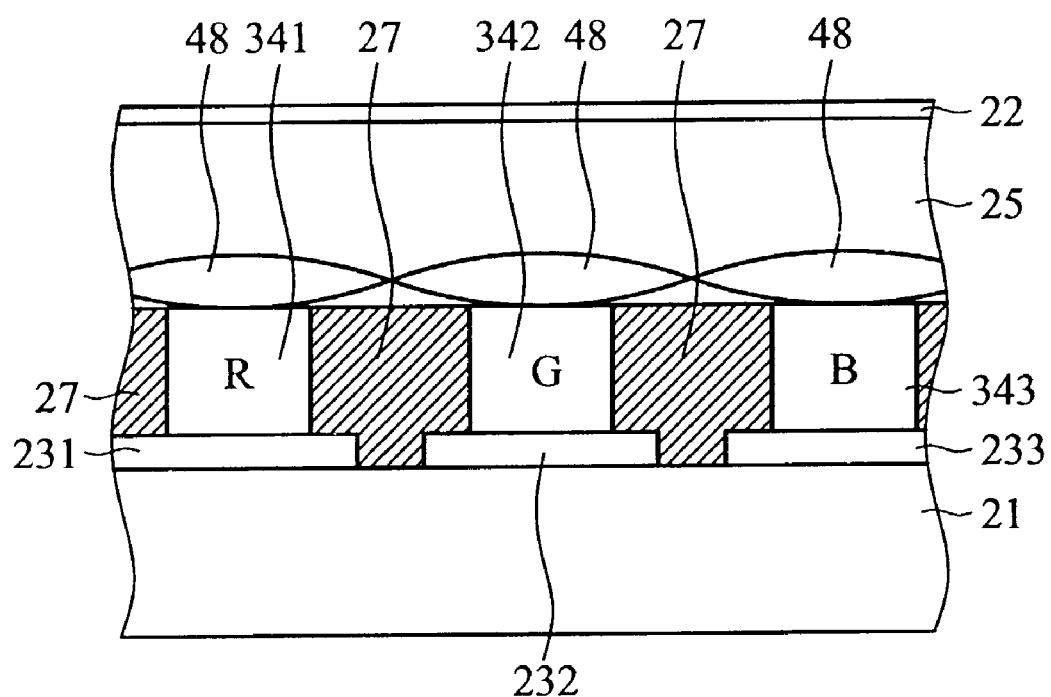
FIG. 4 is a diagram showing a partial cross section of a LCoS panel according to a third embodiment of the invention.

FIG. 4 is a diagram showing a partial cross section of a LCoS panel according to a third embodiment of the invention. The same elements in FIG. 3A and FIG. 4 refer to the same symbols for clarity. By comparing FIG. 3A and FIG. 4, it is noted that additional micro lenses 48 are formed on the color pixels. The micro lenses 48 help to gather the portion of the source light which would be blocked by the photo-resist material 27 onto the mirrors 231~233. This compensates for the low aperture ratio in the second embodiment.

Figure 5A:
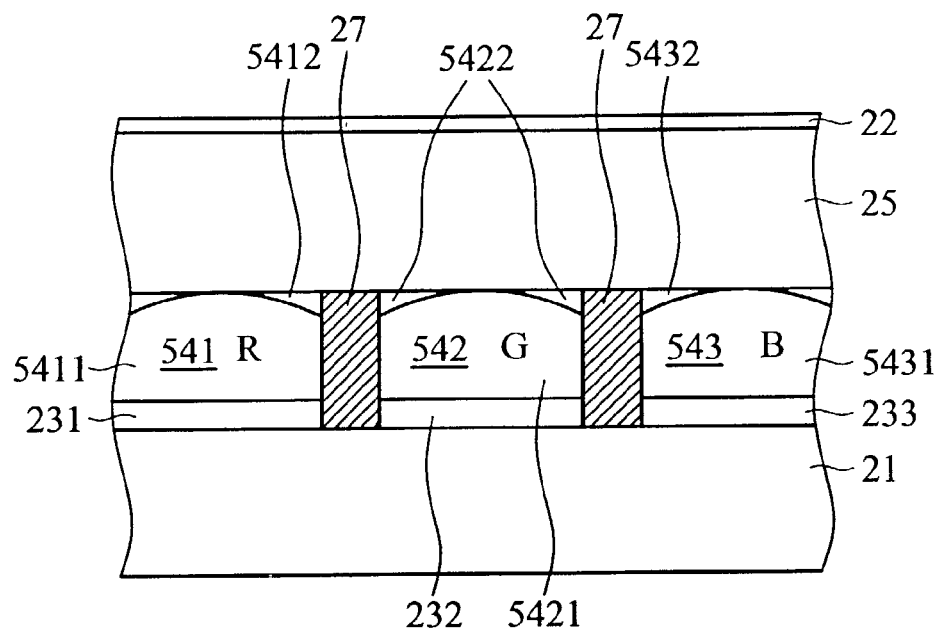
FIGS. 5A and 5B are diagrams showing partial cross sections of a LCoS panel according to a fourth embodiment of the invention.

FIG. 5A is a diagram showing a partial cross section of a LCoS panel according to a fourth embodiment of the invention. The same elements in FIG. 2 and FIG. 5A refer to the same symbols for clarity. By comparing FIG. 2 and FIG. 5A, it is noted that the color filters 541~543 comprise colored portions 5411~5431 and transparent portions 5412~5432. The colored portions 5411~5431 are disposed on the pixel electrode 231~233 respectively, each having a convex surface. The transparent portions 5412~5432 are disposed on the colored portions 5411~5431 for the purpose of planarization. These color filters 541~543 have an advantage in that they also act as micro lenses.

Figure 5B:
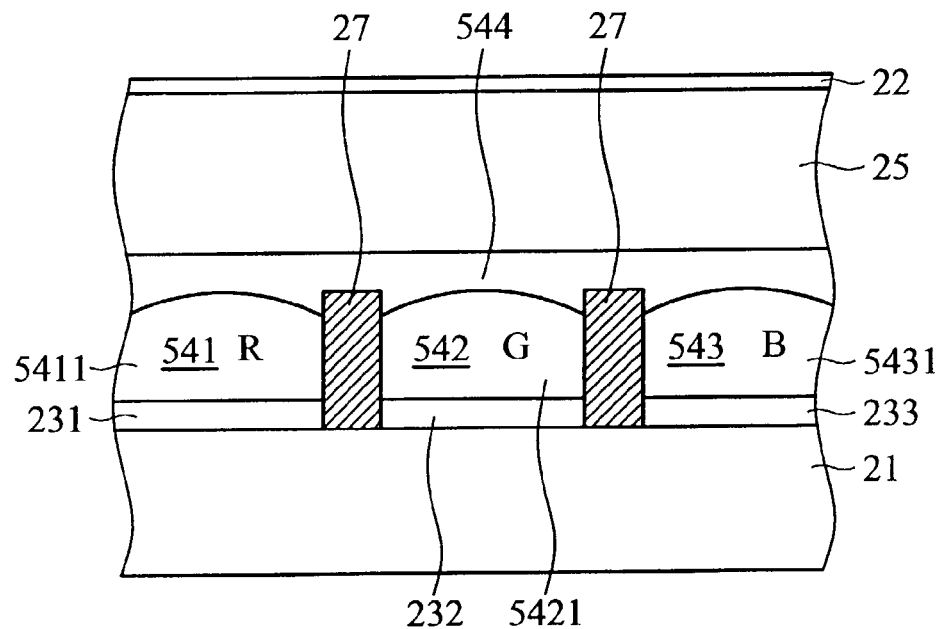

Alternatively, the LCoS panel in FIG. 5A may have thicker transparent portions 5412~5432 of the color filters 541~543, which are integrated into one common transparent layer 544, as shown in FIG. 5B. This is achieved by decreasing the polished depth in a CMP step.

Figure 6A:
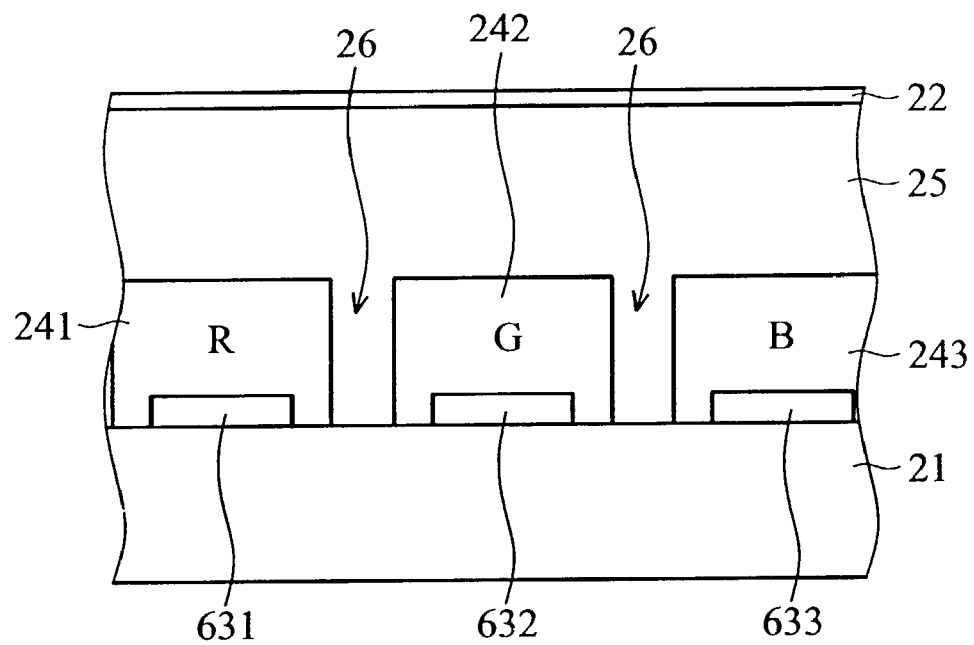
FIG. 6A is a diagram showing a partial cross section of a LCoS panel according to a fifth embodiment of the invention.
Figure 6B:
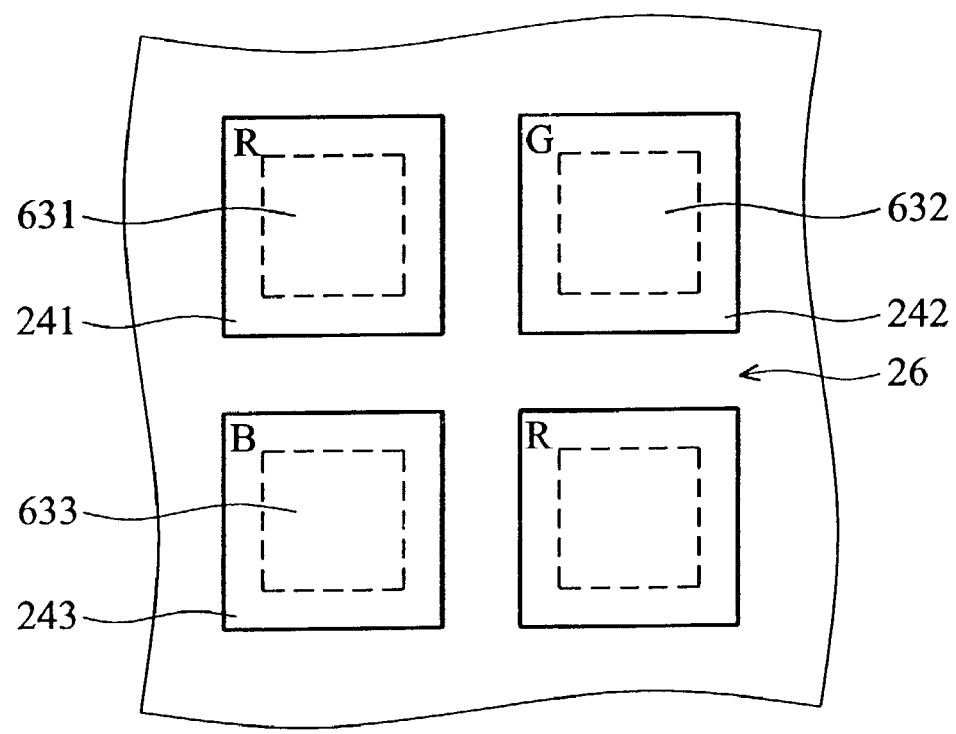
FIG. 6B is a diagram showing a top view of the fifth embodiment.

FIG. 6A is a diagram showing a partial cross section of a LCoS panel according to a fifth embodiment of the invention. The same elements in FIG. 2 and FIG. 6A refer to the same symbols for clarity. By comparing FIG. 2 and FIG. 6A, it is noted that the pixel electrodes 631~633 shown in FIG. 6A have edges not aligned with the edges of the color filters 241~243 and the gaps 26 are filled with the liquid crystal 25. Further, by referring to the top view shown in FIG. 6B, it is also noted that the edges of the pixel electrodes 631~633 are surrounded by those of the color filters 241~243. Since the source light projected onto the color pixels through the pixel edge areas is not reflected by the smaller mirrors 631~633, the stray electric fields have no impact on the image quality. This eliminates the fringe effects caused by the improperly twisted liquid crystal in the gaps and pixel edge areas.

Figure 7:
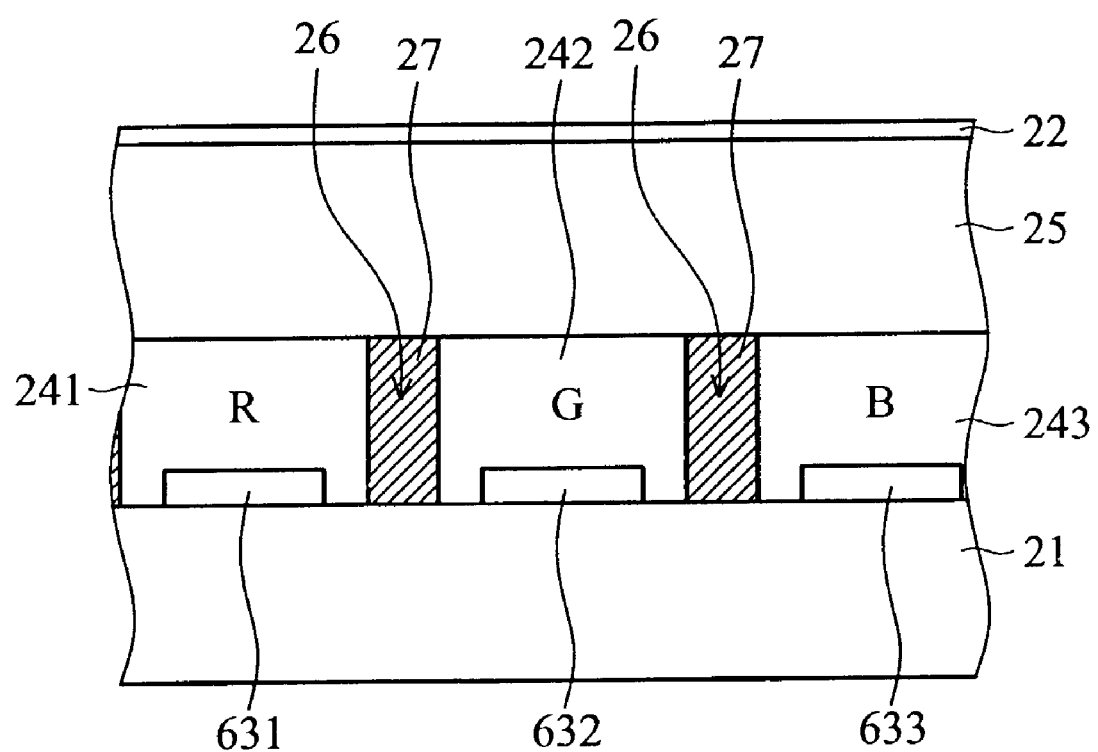
FIG. 7 is a diagram showing a partial cross section of a LCoS panel according to a sixth embodiment of the invention.

FIG. 7 is a diagram showing a partial cross section of a LCoS panel according to a sixth embodiment of the invention. The same elements in FIG. 6A and FIG. 7 refer to the same symbols for clarity. By comparing FIG. 7 and FIG. 6A, it is noted that the gaps 26 in the FIG. 7 filled with the photo-resist material 27 or the like.

In all the previously described embodiments, the panel may be manufactured by a standard LCoS panel process except that there is an additional step for depositing the photo-resist material in the gaps, which is followed by a CMP step.

In conclusion, the present invention provides a new liquid crystal on silicon panel and a manufacturing method thereof to eliminate the disadvantageous fringe effect. Gaps are filled with a photo-resist material or the like, containing a black pigment. This expels from the gaps liquid crystal which would be improperly twisted by stray electric fields.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A liquid crystal on silicon panel, comprising:
   a lower and upper substrate, wherein the lower substrate is made of silicon material;
   a liquid crystal sealed between the lower and the upper substrate; and
   a plurality of color pixels disposed on the lower substrate and separated from each other by gaps, each color pixel comprising an individual pixel electrode on and in contact with the lower substrate and an individual color filter completely covering and in contact with the individual pixel electrode;
   wherein
   a light-absorber material composed of photoresist material fills in each gap between neighboring color pixels and
   each color filter is not covered by the light-absorber material.

2. The liquid crystal on silicon panel as claimed in claim 1, wherein the upper substrate is a glass substrate with an ITO layer.

3. The liquid crystal on silicon panel as claimed in claim 1, wherein the pixel electrodes are optically reflective.

4. The liquid crystal on silicon panel as claimed in claim 1, wherein the color filters are microcolor filters of red, green and blue.

5. The liquid crystal on silicon panel as claimed in claim 1, wherein the light-absorber material is a photo-resist material containing a black pigment.

6. The liquid crystal on silicon panel as claimed in claim 1, wherein the light-absorber material and the color pixels commonly form a planar surface.

7. The liquid crystal on silicon panel as claimed in claim 1, wherein the lower substrate comprises an integrated circuit for proving voltage differences between the upper substrate and the pixel electrodes.

* * * * *